US012577048B2

(12) United States Patent
Fjeldheim

(10) Patent No.: US 12,577,048 B2
(45) Date of Patent: Mar. 17, 2026

(54) METHOD FOR MONITORING A STORAGE SYSTEM WITH A FLYING DRONE

(71) Applicant: Autostore Technology AS, Nedre Vats (NO)

(72) Inventor: Ivar Fjeldheim, Haugesund (NO)

(73) Assignee: AutoStore Technology AS, Nedre Vats (NO)

( * ) Notice: Subject to any disclaimer, the term of this patent is extended or adjusted under 35 U.S.C. 154(b) by 678 days.

(21) Appl. No.: 17/922,161

(22) PCT Filed: Apr. 27, 2021

(86) PCT No.: PCT/EP2021/060943
§ 371 (c)(1),
(2) Date: Oct. 28, 2022

(87) PCT Pub. No.: WO2021/219612
PCT Pub. Date: Nov. 4, 2021

(65) Prior Publication Data
US 2023/0166913 A1 Jun. 1, 2023

(30) Foreign Application Priority Data

Apr. 29, 2020 (NO) .................................. 20200505
Jun. 8, 2020 (NO) .................................. 20200675

(51) Int. Cl.
*G05D 1/221* (2024.01)
*B64C 39/02* (2023.01)
(Continued)

(52) U.S. Cl.
CPC .......... *B65G 1/1373* (2013.01); *B64C 39/024* (2013.01); *B65G 1/0464* (2013.01); (Continued)

(58) Field of Classification Search
CPC .... B65G 1/1373; B65G 1/0464; B65G 1/065; B64C 39/024; G05D 1/46; B64U 10/14; (Continued)

(56) References Cited

U.S. PATENT DOCUMENTS

2003/0164794 A1* 9/2003 Haynes .............. H04B 7/18504
342/353
2016/0371850 A1* 12/2016 Kwon .................. G06V 10/507
(Continued)

FOREIGN PATENT DOCUMENTS

CN 205230342 U 5/2016
CN 106504362 A 3/2017
(Continued)

OTHER PUBLICATIONS

CN-107817819-A (Year: 2018).*
(Continued)

*Primary Examiner* — Ernesto A Suarez
*Assistant Examiner* — Laurence R Brothers
(74) *Attorney, Agent, or Firm* — Baker Botts L.L.P.

(57) ABSTRACT

An automated storage and retrieval system includes a storage grid provided by a framework structure arranged in a building under a ceiling. The framework structure includes a rail system arranged at an upper level of the framework structure. The rail system includes a first set of parallel rails arranged in a horizontal plane and extending in a first direction, and a second set of parallel rails arranged in the horizontal plane and extending in a second direction which is orthogonal to the first direction. The first and second sets of rails form a grid pattern in the horizontal plane including a plurality of adjacent access openings/grid cells. The storage grid defines a plurality of storage columns. Each storage column being arranged to store a respective stack of storage
(Continued)

containers. The storage columns are located beneath the rail system. Each storage column is located vertically below a respective access opening/grid cell. Container handling vehicles operate on the rail system to collect and return storage containers to and from storage columns. A control system monitors and controls the automated grid storage and retrieval system. A method for monitoring the automated storage and retrieval system includes: launching a flying drone equipped with a camera to an altitude in an airspace located between an upper surface of framework structure and the ceiling or roof obstacle beneath the ceiling, navigating the drone to a suspected location of an anomaly in the system or other aspect of the system in need of inspection, using the drone to locate the anomaly or aspect of the system in need of inspection, and performing a visual inspection of the anomaly or aspect of the system in need of inspection using the camera of the flying drone. The control system includes an exception handler module responsible for identifying and attempting to correct anomalies in the operation of the storage system, and a flight control module responsible for controlling the flight of the drone. The flight control module directs the flight of the drone in response to instructions received from the exception handler module.

12 Claims, 9 Drawing Sheets

(51) Int. Cl.

| | |
|---|---|
| *B64U 10/14* | (2023.01) |
| *B64U 101/26* | (2023.01) |
| *B64U 101/30* | (2023.01) |
| *B65G 1/04* | (2006.01) |
| *B65G 1/06* | (2006.01) |
| *B65G 1/137* | (2006.01) |
| *G05D 1/46* | (2024.01) |
| *B64U 20/87* | (2023.01) |

(52) U.S. Cl.
CPC ............. *B65G 1/065* (2013.01); *G05D 1/221* (2024.01); *G05D 1/46* (2024.01); *B64U 10/14* (2023.01); *B64U 2101/26* (2023.01); *B64U 2101/30* (2023.01); *B64U 2201/10* (2023.01); *B64U 2201/20* (2023.01); *B65G 1/04* (2013.01); *B65G 1/0492* (2013.01)

(58) Field of Classification Search
CPC ............ B64U 2101/26; B64U 2101/30; B64U 2201/10; B64U 2201/20
See application file for complete search history.

(56) References Cited

U.S. PATENT DOCUMENTS

| | | | | |
|---|---|---|---|---|
| 2017/0337826 A1 * | 11/2017 | Moran | ..................... | G08G 5/57 |
| 2018/0068567 A1 * | 3/2018 | Gong | .................... | H04W 4/022 |
| 2018/0194571 A1 * | 7/2018 | Fryer | ........................ | B66C 5/04 |
| 2018/0335338 A1 | 11/2018 | Matsushita | | |
| 2019/0009986 A1 | 1/2019 | Yamashita | | |
| 2019/0235489 A1 * | 8/2019 | Cantrell | ................. | G05D 1/101 |
| 2019/0332998 A1 * | 10/2019 | Ruxton | ................ | G05D 1/0044 |

FOREIGN PATENT DOCUMENTS

| | | | | | | |
|---|---|---|---|---|---|---|
| CN | 107817819 | A | * | 3/2018 | .......... | G05D 1/0808 |
| CN | 108427423 | A | * | 8/2018 | .......... | G05D 1/0242 |
| CN | 108960374 | A | * | 12/2018 | ............ | G05D 1/101 |
| CN | 110001956 | A | | 7/2019 | | |
| CN | 110612259 | A | | 12/2019 | | |
| NO | 317366 | B1 | | 10/2004 | | |
| WO | 2014/075937 | A1 | | 5/2014 | | |
| WO | 2014/090684 | A1 | | 6/2014 | | |
| WO | 2015/009467 | A1 | | 1/2015 | | |
| WO | 2015/193278 | A1 | | 12/2015 | | |
| WO | 2018/035482 | A1 | | 2/2018 | | |
| WO | 2018/146304 | A1 | | 8/2018 | | |
| WO | 2019/112104 | A1 | | 6/2019 | | |
| WO | WO-2019144286 | A1 | * | 8/2019 | ............ | G01C 11/00 |
| WO | 2019/199884 | A1 | | 10/2019 | | |
| WO | WO-2019238687 | A1 | * | 12/2019 | ........... | B65G 1/0464 |

OTHER PUBLICATIONS

CN-108427423-A (Year: 2018).*
WO-2019144286-A1 (Year: 2019).*
WO-2019238687-A1 (Year: 2019).*
CN-108960374-A (Year: 2018).*
Coquau, Stephane, Extended European Search Report for European patent application No. EP24177058.5, dated Sep. 18, 2024, 8 pages, published by the European Patent Office, Munich, Germany.
Zhu Youzhi, Notice of First Office Action for Chinese Patent Application No. CN2021800318173, dated Oct. 25, 2024, 7 pages, published by the National Intellectual Property Administration, PRC, China.
Kazuyuki Fukushima, Notice of Reasons for Rejection for Japanese Patent Application No. 2022-565800, mailed Apr. 14, 2025, 6 pages, pub. by the JPO.
International Search Report issued in PCT/EP2021/060943 on Jul. 16, 2021 (6 pages).
Written Opinion of the International Searching Authority issued in PCT/EP2021/060943 on Jul. 16, 2021 (7 pages).
Norwegian Search Report issued in No. 20200675 mailed on Dec. 10, 2020 (2 pages).
International Preliminary Report on Patentability from PCT/EP2021/060943 mailed on Apr. 6, 2022 (12 pages).

* cited by examiner

METHOD FOR MONITORING A STORAGE SYSTEM WITH A FLYING DRONE

FIELD OF THE INVENTION

The present invention relates to an automated storage and retrieval system for storage and retrieval of containers, in particular to methods for monitoring such systems for errors, and more particularly to a method for locating and monitoring disabled or malfunctioning autonomous container-handling vehicles operating on such a system.

BACKGROUND AND PRIOR ART

FIG. 1 discloses a typical prior art automated storage and retrieval system 1 with a framework structure 100 and FIGS. 2 and 3 disclose two different prior art container handling vehicles 201,301 suitable for operating on such a system 1.

The framework structure 100 comprises upright members 102, horizontal members 103 and a storage volume comprising storage columns 105 arranged in rows between the upright members 102 and the horizontal members 103. In these storage columns 105 storage containers 106, also known as bins, are stacked one on top of one another to form stacks 107. The members 102, 103 may typically be made of metal, e.g. extruded aluminum profiles.

The framework structure 100 of the automated storage and retrieval system 1 comprises a rail system 108 arranged across the top of framework structure 100, on which rail system 108 a plurality of container handling vehicles 201, 301 are operated to raise storage containers 106 from, and lower storage containers 106 into, the storage columns 105, and also to transport the storage containers 106 above the storage columns 105. The rail system 108 comprises a first set of parallel rails 110 arranged to guide movement of the container handling vehicles 201,301 in a first direction X across the top of the frame structure 100, and a second set of parallel rails 111 arranged perpendicular to the first set of rails 110 to guide movement of the container handling vehicles 201,301 in a second direction Y which is perpendicular to the first direction X. Containers 106 stored in the columns 105 are accessed by the container handling vehicles through access openings/grid cells 112 in the rail system 108. The container handling vehicles 201,301 can move laterally above the storage columns 105, i.e. in a plane which is parallel to the horizontal X-Y plane.

The upright members 102 of the framework structure 100 may be used to guide the storage containers during raising of the containers out from and lowering of the containers into the columns 105. The stacks 107 of containers 106 are typically self-supportive.

Each prior art container handling vehicle 201,301 comprises a vehicle body 201a,301a, and first and second sets of wheels 201b,301b,201c,301c which enable the lateral movement of the container handling vehicles 201,301 in the X direction and in the Y direction, respectively. In FIGS. 2 and 3 two wheels in each set are fully visible. The first set of wheels 201b,301b is arranged to engage with two adjacent rails of the first set 110 of rails, and the second set of wheels 201c,301c is arranged to engage with two adjacent rails of the second set 111 of rails. At least one of the sets of wheels 201b,301b,201c,301c can be lifted and lowered, so that the first set of wheels 201b,301b and/or the second set of wheels 201c,301c can be engaged with the respective set of rails 110, 111 at any one time.

Each prior art container handling vehicle 201,301 also comprises a lifting device (not shown) for vertical transportation of storage containers 106, e.g. raising a storage container 106 from, and lowering a storage container 106 into, a storage column 105. The lifting device comprises one or more gripping/engaging devices which are adapted to engage a storage container 106, and which gripping/engaging devices can be lowered from the vehicle 201,301 so that the position of the gripping/engaging devices with respect to the vehicle 201,301 can be adjusted in a third direction Z which is orthogonal the first direction X and the second direction Y. Parts of the gripping device of the container handling vehicle 301 are shown in FIG. 3 indicated with reference number 304. The gripping device of the container handling device 201 is located within the vehicle body 301a in FIG. 2.

Conventionally, and also for the purpose of this application, Z=1 identifies the uppermost layer of storage containers, i.e. the layer immediately below the rail system 108, Z=2 the second layer below the rail system 108, Z=3 the third layer etc. In the exemplary prior art disclosed in FIG. 1, Z=8 identifies the lowermost, bottom layer of storage containers. Similarly, X=1 . . . n and Y=1 . . . n identifies the position of each storage column 105 in the horizontal plane. Consequently, as an example, and using the Cartesian coordinate system X, Y, Z indicated in FIG. 1, the storage container identified as 106' in FIG. 1 can be said to occupy storage position X=10, Y=2, Z=3. The container handling vehicles 201,301 can be said to travel in layer Z=0, and each storage column 105 can be identified by its X and Y coordinates.

The storage volume of the framework structure 100 has often been referred to as a grid 104, where the possible storage positions within this grid are referred to as storage cells. Each storage column may be identified by a position in an X- and Y-direction, while each storage cell may be identified by a container number in the X-, Y and Z-direction.

Each prior art container handling vehicle 201,301 comprises a storage compartment or space for receiving and stowing a storage container 106 when transporting the storage container 106 across the rail system 108. The storage space may comprise a cavity arranged centrally within the vehicle body 201a as shown in FIG. 2 and as described in e.g. WO2015/193278A1, the contents of which are incorporated herein by reference.

FIG. 3 shows an alternative configuration of a container handling vehicle 301 with a cantilever construction. Such a vehicle is described in detail in e.g. NO317366, the contents of which are also incorporated herein by reference.

The central cavity container handling vehicles 201 shown in FIG. 2 may have a footprint that covers an area with dimensions in the X and Y directions which is generally equal to the lateral extent of a storage column 105, e.g. as is described in WO2015/193278A1, the contents of which are incorporated herein by reference. The term 'lateral' used herein may mean 'horizontal'.

Alternatively, the central cavity container handling vehicles 101 may have a footprint which is larger than the lateral area defined by a storage column 105, e.g. as is disclosed in WO2014/090684A1.

The rail system 108 typically comprises rails with grooves in which the wheels of the vehicles run. Alternatively, the rails may comprise upwardly protruding elements, where the wheels of the vehicles comprise flanges to prevent derailing. These grooves and upwardly protruding elements are collectively known as tracks. Each rail may comprise one track, or each rail may comprise two parallel tracks.

WO2018146304, the contents of which are incorporated herein by reference, illustrates a typical configuration of rail system 108 comprising rails and parallel tracks in both X and Y directions.

In the framework structure 100, a majority of the columns 105 are storage columns 105, i.e. columns 105 where storage containers 106 are stored in stacks 107. However, some columns 105 may have other purposes. In FIG. 1, columns 119 and 120 are such special-purpose columns used by the container handling vehicles 201,301 to drop off and/or pick up storage containers 106 so that they can be transported to an access station (not shown) where the storage containers 106 can be accessed from outside of the framework structure 100 or transferred out of or into the framework structure 100. Within the art, such a location is normally referred to as a 'port' and the column in which the port is located may be referred to as a 'port column' 119,120. The transportation to the access station may be in any direction, that is horizontal, tilted and/or vertical. For example, the storage containers 106 may be placed in a random or dedicated column 105 within the framework structure 100, then picked up by any container handling vehicle and transported to a port column 119,120 for further transportation to an access station. Note that the term 'tilted' means transportation of storage containers 106 having a general transportation orientation somewhere between horizontal and vertical.

In FIG. 1, the first port column 119 may for example be a dedicated drop-off port column where the container handling vehicles 201,301 can drop off storage containers 106 to be transported to an access or a transfer station, and the second port column 120 may be a dedicated pick-up port column where the container handling vehicles 201,301 can pick up storage containers 106 that have been transported from an access or a transfer station.

The access station may typically be a picking or a stocking station where product items are removed from or positioned into the storage containers 106. In a picking or a stocking station, the storage containers 106 are normally not removed from the automated storage and retrieval system 1 but are returned into the framework structure 100 again once accessed. A port can also be used for transferring storage containers to another storage facility (e.g. to another framework structure or to another automated storage and retrieval system), to a transport vehicle (e.g. a train or a lorry), or to a production facility.

A conveyor system comprising conveyors is normally employed to transport the storage containers between the port columns 119,120 and the access station.

If the port columns 119,120 and the access station are located at different levels, the conveyor system may comprise a lift device with a vertical component for transporting the storage containers 106 vertically between the port column 119,120 and the access station.

The conveyor system may be arranged to transfer storage containers 106 between different framework structures, e.g. as is described in WO2014/075937A1, the contents of which are incorporated herein by reference.

When a storage container 106 stored in one of the columns 105 disclosed in FIG. 1 is to be accessed, one of the container handling vehicles 201,301 is instructed to retrieve the target storage container 106 from its position and transport it to the drop-off port column 119. This operation involves moving the container handling vehicle 201,301 to a location above the storage column 105 in which the target storage container 106 is positioned, retrieving the storage container 106 from the storage column 105 using the container handling vehicle's 201,301 lifting device (not shown), and transporting the storage container 106 to the drop-off port column 119. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port column 119, or with one or a plurality of other cooperating container handling vehicles. Alternatively, or in addition, the automated storage and retrieval system 1 may have container handling vehicles specifically dedicated to the task of temporarily removing storage containers from a storage column 105. Once the target storage container 106 has been removed from the storage column 105, the temporarily removed storage containers can be repositioned into the original storage column 105. However, the removed storage containers may alternatively be relocated to other storage columns.

When a storage container 106 is to be stored in one of the columns 105, one of the container handling vehicles 201,301 is instructed to pick up the storage container 106 from the pick-up port column 120 and transport it to a location above the storage column 105 where it is to be stored. After any storage containers positioned at or above the target position within the storage column stack 107 have been removed, the container handling vehicle 201,301 positions the storage container 106 at the desired position. The removed storage containers may then be lowered back into the storage column 105 or relocated to other storage columns.

For monitoring and controlling the automated storage and retrieval system 1, e.g. monitoring and controlling the location of respective storage containers 106 within the framework structure 100, the content of each storage container 106; and the movement of the container handling vehicles 201,301 so that a desired storage container 106 can be delivered to the desired location at the desired time without the container handling vehicles 201,301 colliding with each other, the automated storage and retrieval system 1 comprises a control system 500 which typically is computerized and which typically comprises a database for keeping track of the storage containers 106.

Prior Art Methods of Monitoring Errors in the Storage Systems

As can be appreciated, prior art storage and retrieval systems as described above are highly automated. The complicated logistics of the system and the operation of the autonomous container-handling vehicles (also referred to as "robots") are managed by a computerized control system. Such systems, as well as the robots themselves, are unavoidably prone to errors and malfunctions.

In such prior art storage systems, the control system often comprises a number of software programs or Modules each responsible for a different aspect of the overall control of the system. One such module is a so called an "exception handler" module 501 responsible for identifying, monitoring and repairing errors or malfunctions with the container handling vehicles.

The exception handler module can in many instances perform the following actions without user intervention:

Automatically fix >97% of fixable robot errors without any interruption on the system operation When a robot reports an error, the exception handler module takes over control of that specific robot, while the other robots operate as usual The exception module may block an area of cells around the malfunctioning robot if the robot is not 100% sure of it's own position. The system may operate as normal outside the confines of the blocked area.

The exception module may use the robot's lift device to search for a unique patterns of container depths (in the storage columns) within a blocked area to detect a robot's position If needed, another robot can be commanded to create a unique pattern of container depths to help identify the location of a malfunctioning robot.

In some cases identifying the particular cell on which a malfunctioning robot is located (or the vehicle may be between cells) or the precise location of other types anomaly is a challenge. This latter problem is particularly difficult in the case of a very large storage system with a low ceiling height. With a low ceiling height, all spots within a very large surface area look similar when viewed from above, making visual confirmation (for example with fixed cameras) of a robot's location difficult. Manual inspection of the upper surface of the storage system framework structure by a human inspector is therefore often required. This is a dangerous operation, however, often requiring a costly shut down of the system. There is a need, therefore, for an additional or alternative means of confirming errors, determining the precise location of disabled vehicles or otherwise performing a visual inspection of the storage system.

Flying Drones

Small flying drones are commercially available. An example of such commercially available drones includes the fleet of small quadcopters available from the Drone manufacturer DJI® of Shenzen, China. Such drones have become quite sophisticated, with advanced positioning systems and obstacle avoidance systems making operation of the drones relatively simple and reliable.

Drones may operate both indoors and outdoors. When outdoors the drones use GPS to determine position. The drone uses GPS info to hover in a fixed position, to navigate to desired locations and to return home in case communication with the pilot is lost. Drones also have a variety of other sensors: front, rear, top and bottom collision detectors. Barometric pressure sensors are also used for determining altitude etc.

When flying indoors, a GPS signal is often not available. In such situations, the drones often use a downward facing optical sensor to identify patterns on the floor in order to hover in a fixed position.

SUMMARY OF THE INVENTION

The present invention is set forth and characterized in the independent claims, while the dependent claims describe other characteristics of the invention.

In one aspect, the invention concerns a method of using a flying drone to visually inspect the storage system, in particular to locate, identify and inspect a malfunctioning container handling vehicle or other errors in an automated storage and retrieval system of the type described above.

In a second aspect, the invention concerns a method of locating and addressing an error in an automated storage and retrieval system wherein an exception handler module of a control system communicates with and controls a flying drone to locate and inspect a suspected error in the system, for example a malfunctioning autonomous container-handling vehicle.

In a third aspect, a human operator pilots the flying drone to locate and inspect a possible error in accordance with the method.

The following is an exemplary embodiment of the steps in a method according to the invention:

A vehicle of the system becomes disabled or otherwise reports an error.

The exception handler module of the control system knows the approximate location of the disabled vehicle. The exception handler module blocks out a large section of the grid surrounding the assumed location.

The exception handler module issues a command to a drone flight control module to deploy a flying drone.

The drone flight control module causes the drone to initiate an automated launch sequence, elevating to a predetermined height above the framework structure of the storage system, but below the height of the ceiling of the warehouse facility in which the framework is arranged.

The drone may have an altitude limiter function that brackets an upper and lower altitude, such that the drone can safely fly in the space above the vehicles operating on the upper level of the framework and below the ceiling.

Based on the assumed location of the disabled vehicle, the drone control module causes the drone to initiate a search pattern.

In one embodiment, the drone uses an onboard optical sensor to navigate the grid pattern of the framework to the approximate location identified by the exception handler module. The drone may navigate over the grid by a number of means. For example, the drone, using optical sensors, may simply count the number of cells as it passes overhead, in the X and Y directions, to navigate to a given coordinate specified by the exception handler module. Alternatively, a fixed positioning arrangement may help the drone navigate over the grid, for example beacons, position identifiers or other means attached at known locations, for example on the ceiling or on the framework structure itself. Such means may have unique visual identifiers, RFD signals etc. recognizable by the drone. Likewise, the drone can recognize a robot, or plurality of robots, for which the exception handler module knows the precise location or may identify patterns in relative vehicle positions or container depth.

Once arriving at the approximate location of the disabled vehicle, the drone may execute a preprogrammed search pattern to identify and precisely locate the disabled vehicle or otherwise identify the disabled vehicle, for example by a unique identifier on the robot. Alternatively or in addition, a human operator may assume control of the drone, using cameras onboard the drone to locate and/or perform a visual inspection of the disabled vehicle or other error.

In another aspect, the disabled vehicle is instructed to send a short range distress signal, for example an RFID signal excitable by signals sent from the drone or other means.

After having identified the exact location of the disabled vehicle, the exception handler module can then redefine a smaller blocked zone, allowing a greater portion of the storage system to continue normal operation.

After completing its mission, the drone can initiate a return sequence, for example using the grid pattern or other navigation means to find its way back to its base and land.

It should be understood that the above described method may be employed for any type of error requiring visual inspection, including for example the inspection of suspected fires or other anomalies in the system or even routine visual inspection.

BRIEF DESCRIPTION OF THE DRAWINGS

Following drawings are appended to facilitate the understanding of the invention. The drawings show embodiments of the invention, which will now be described by way of example only, where.

DETAILED DESCRIPTION OF THE INVENTION

Figure 1:
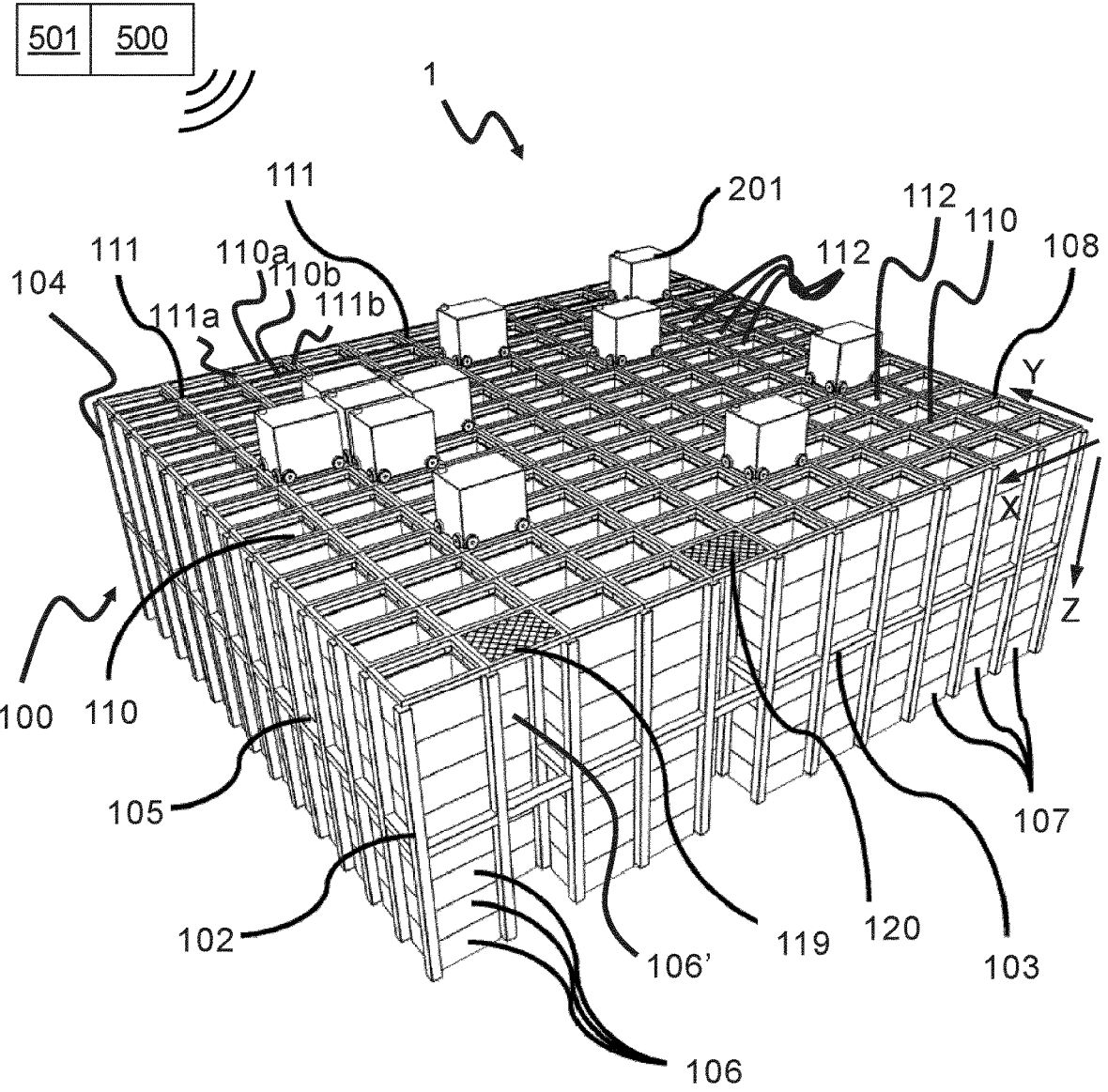
FIG. 1. is a perspective view of a prior art automated storage and retrieval system for storage and retrieval of containers.

In the following, embodiments of the invention will be discussed in more detail with reference to the appended drawings. It should be understood, however, that the drawings are not intended to limit the invention to the subject-matter depicted in the drawings.

Figure 2:
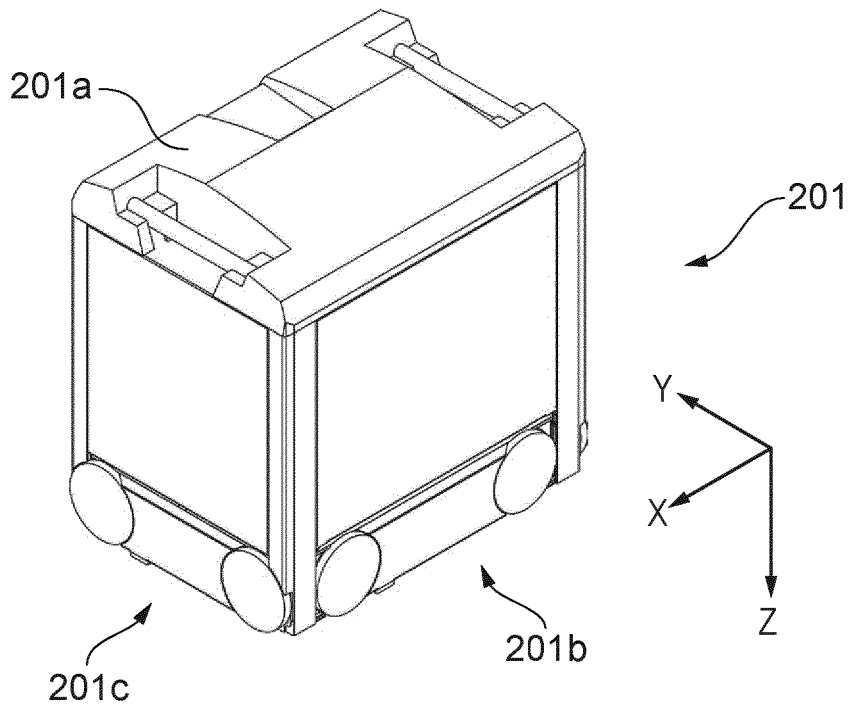
FIGS. 2 and 3 are perspective views showing prior art container handling vehicles.
Figure 3:
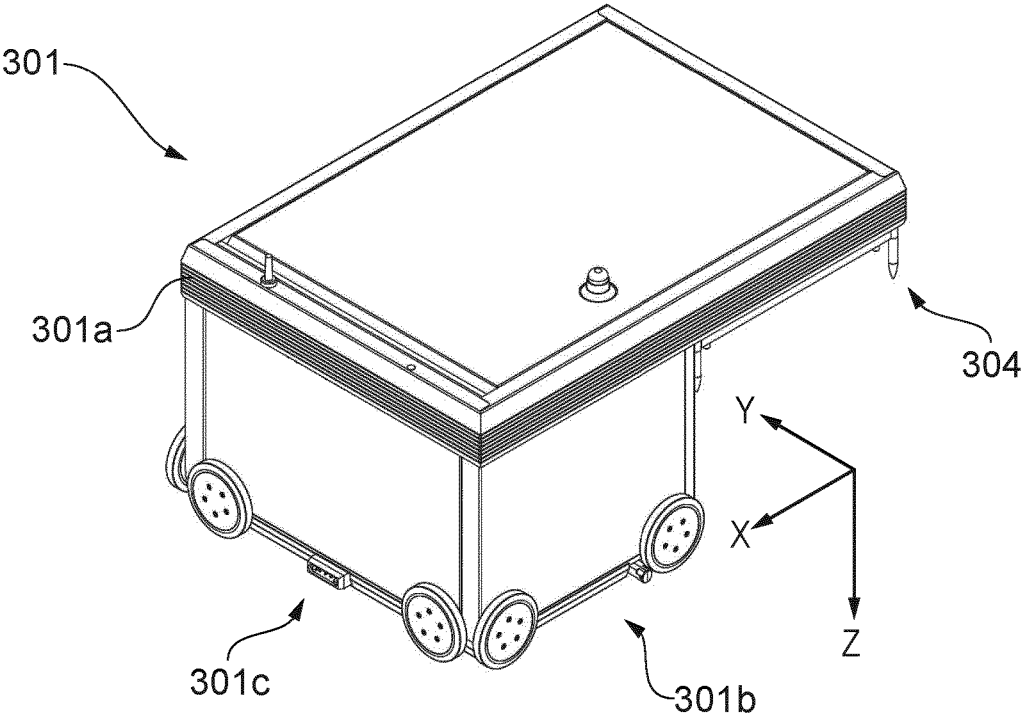

The present invention comprises an automated storage and retrieval system 1, including framework structure 100 constructed in accordance with the prior art described above and illustrated in FIGS. 1-3, i.e. a number of upright members 102 and a number of horizontal members 103, which are supported by the upright members 102, and further that the framework structure 100 comprises a first, upper rail system 108 in the X direction and Y direction, upon which container handling vehicles 201/302 operate.

The framework structure 100 can be of any size. In particular it is understood that the framework structure can be considerably wider and/or longer and/or deeper than disclosed in FIG. 1. For example, the framework structure 100 may have a horizontal extent of more than 700×700 columns and a storage depth of more than twelve containers.

Operation of the automated storage and retrieval system is directed and monitored by a computerized control system 500 that comprises an exception handler module 501 as shown conceptually in FIG. 1 and responsible for inter alia detecting and correcting anomalies or errors in the functioning of the container handling vehicles, such as for example defining a blocked area of the grid surrounding a disabled vehicle.

One embodiment of the automated storage and retrieval system, comprising a method of monitoring such system according to the present invention will now be discussed in more detail with reference to FIGS. 4-10.

Figure 5:
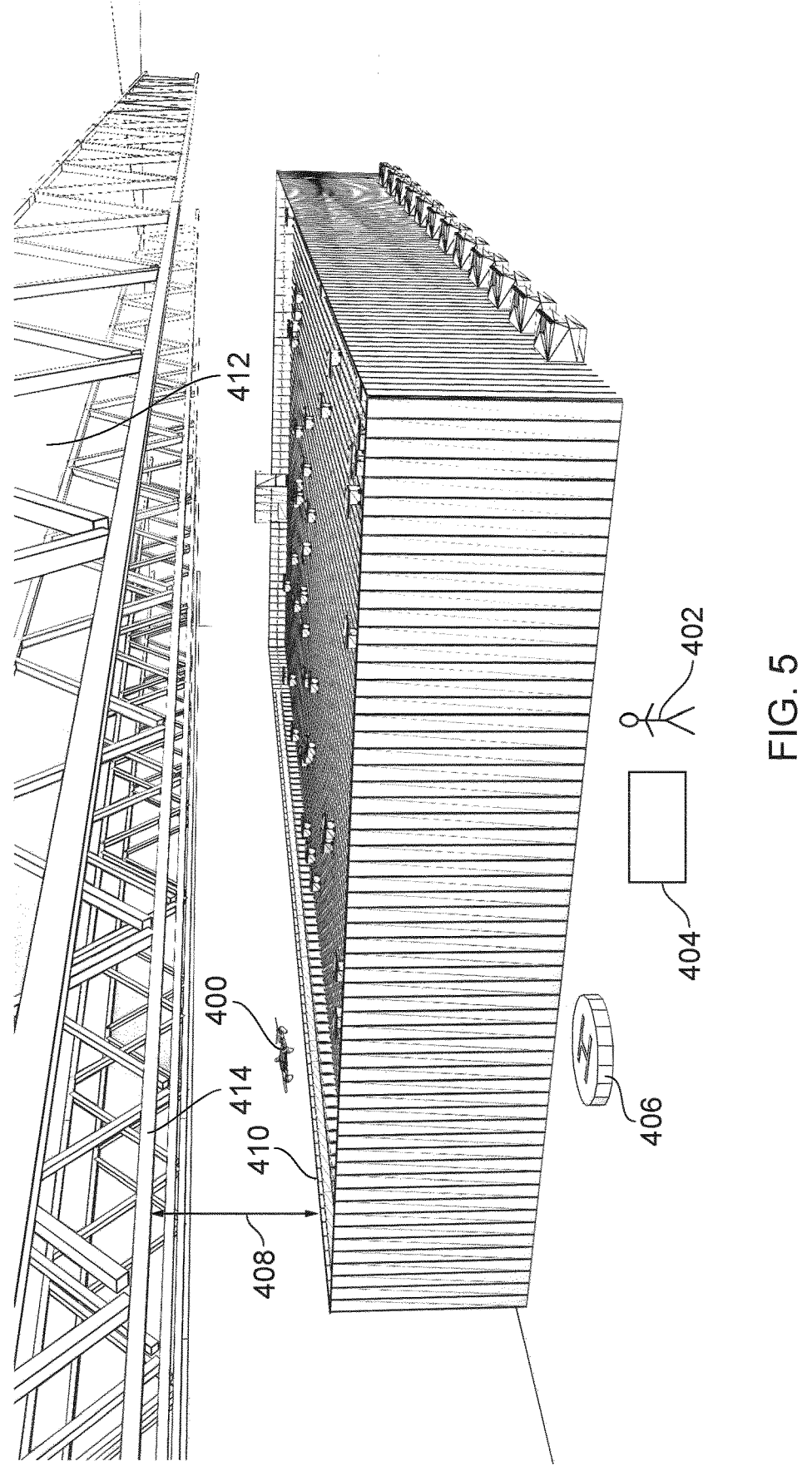
FIG. 5 is a perspective view of a framework structure arranged below a ceiling having girders or other obstacles, as well as a schematic representation of a human drone operator and a drone operation station.

The present invention comprises utilizing a flying drone 400 to monitor operation of the storage system and the localization and visual inspection of various aspects of the system, for example locating and inspecting a disabled container handling vehicle 201A/301A. As used herein the term "flying drone" refers to unmanned, remotely operated rotary-wing aircraft, such as a helicopter or quadcopter, which is partly or wholly sustained in the air by lifting surfaces (rotors) revolving around a vertical axis. Drone 400 can be remotely operated manually by a human pilot 402, for example working at a flight control station 404 as shown in FIG. 5. In another aspect, flight of the drone may be automated, for example controlled by a flight control module 502 of control system 500, for example in communication with the exception handler module 501.

The present invention will be described in connection with one illustrative example of monitoring the system, namely the localization of and visual inspection of a malfunctioning container handling vehicle 201A/301A. It should be understood however that the flying drone can also be utilized for locating and inspecting many other types of errors and conditions, for example inspecting suspected defects in the framework structure, locating suspected fires, or routine visual inspection of the system.

Figure 4:
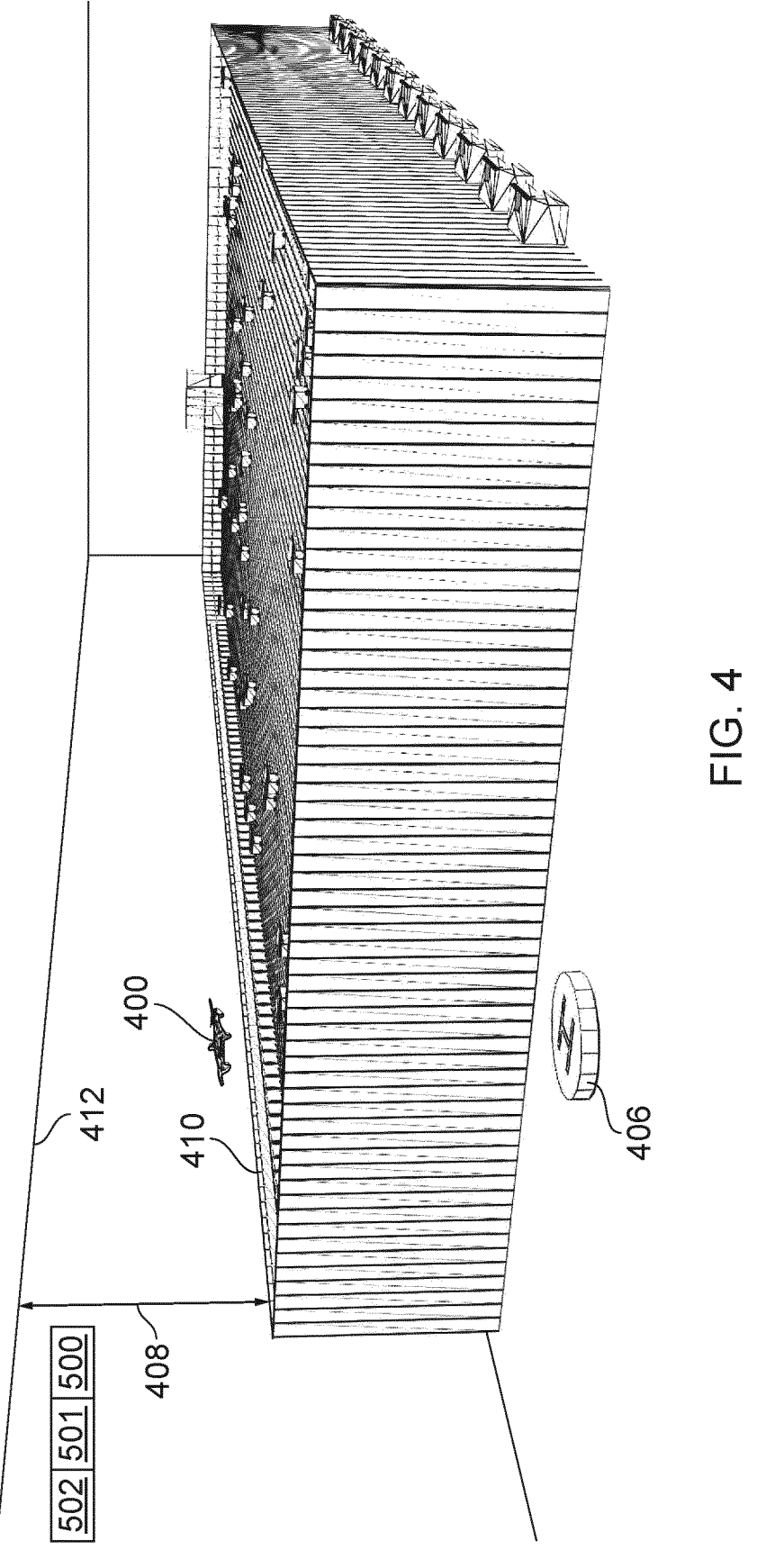
FIG. 4 is a perspective view of a framework structure of a prior art automated storage and retrieval system illustrating a flying drone having taken off from a launch pad and hovering between a ceiling and an upper surface of the framework structure.

As illustrated in FIG. 4, a drone 400 is launched from a launch pad 406. The drone may be controlled by flight control module 502 or may be controlled by human pilot 402. Drone 400 is flown to an altitude in the airspace 408 between an upper surface 410 of the framework structure and a ceiling 412 of a building in which the storage system is installed. As shown in FIG. 5, airspace 408 may also be the altitude between upper surface 410 and an obstacle attached to ceiling 412, for example girders 414.

Figure 6:
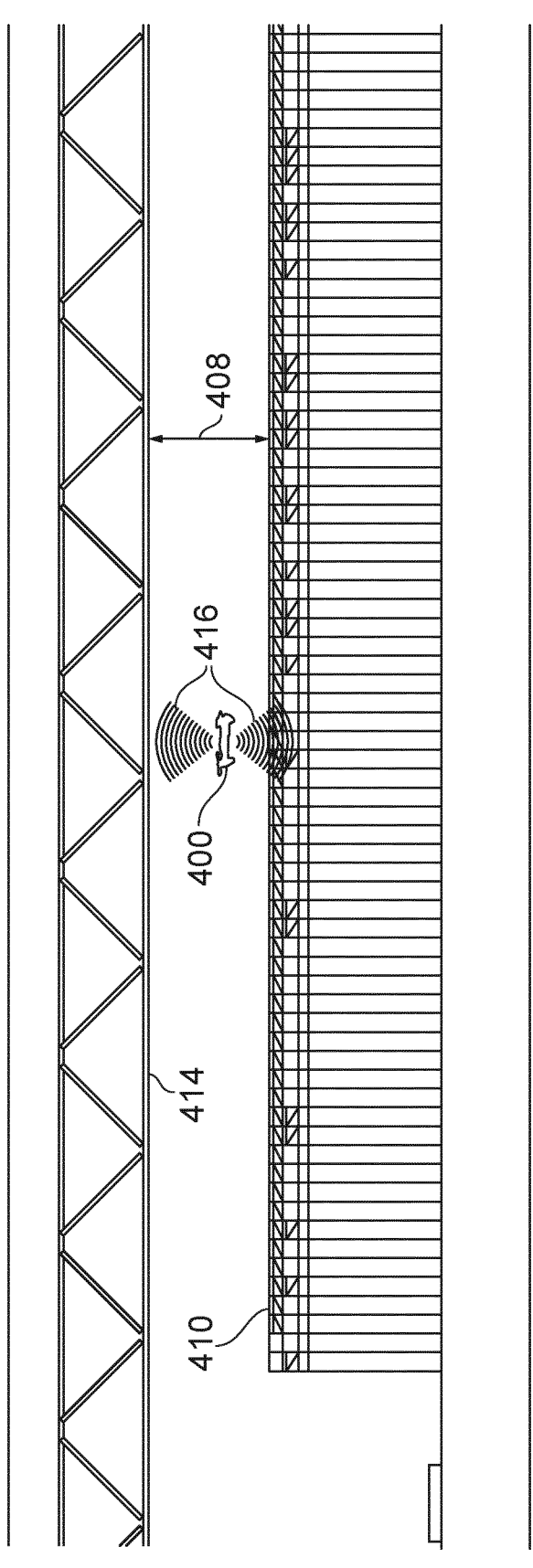
FIG. 6 is a side elevational view showing a drone using sensors to avoid contact with the ceiling/girders and the framework structure.
Figure 7:
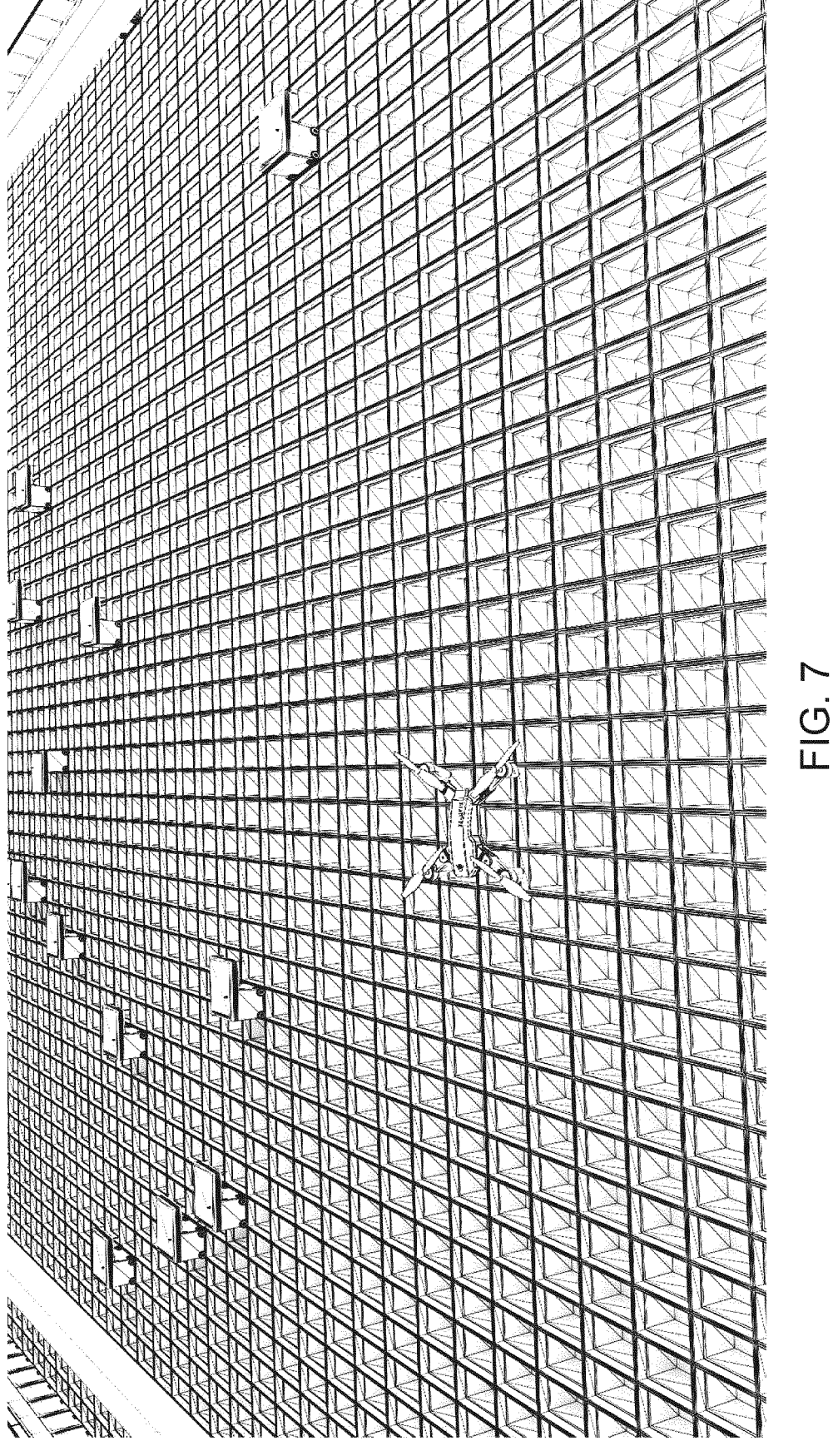
FIG. 7 is a perspective view illustrating a drone flying at a relatively low altitude above a section of a grid devoid of container handling vehicles

As shown in FIG. 6, drone 400 may comprise a camera 415 (not illustrated) as well as obstacle avoidance sensors 416 arranged to maintain the drone's altitude within airspace 408. The drone may also have altitude limits preprogrammed, for example controlled by flight control module 502.

The drone is the sent on a flight mission to locate the disabled vehicle 201A/301A. As can be appreciated from FIG. 7, the upper surface of the framework structure may have large areas without operational vehicles or other visual cues for visual confirmation of the drone's precise location at a given point during the flight mission. The method of the invention therefore comprises navigation means permitting the drone to navigate above the framework structure and determine a precise location.

Figure 8:
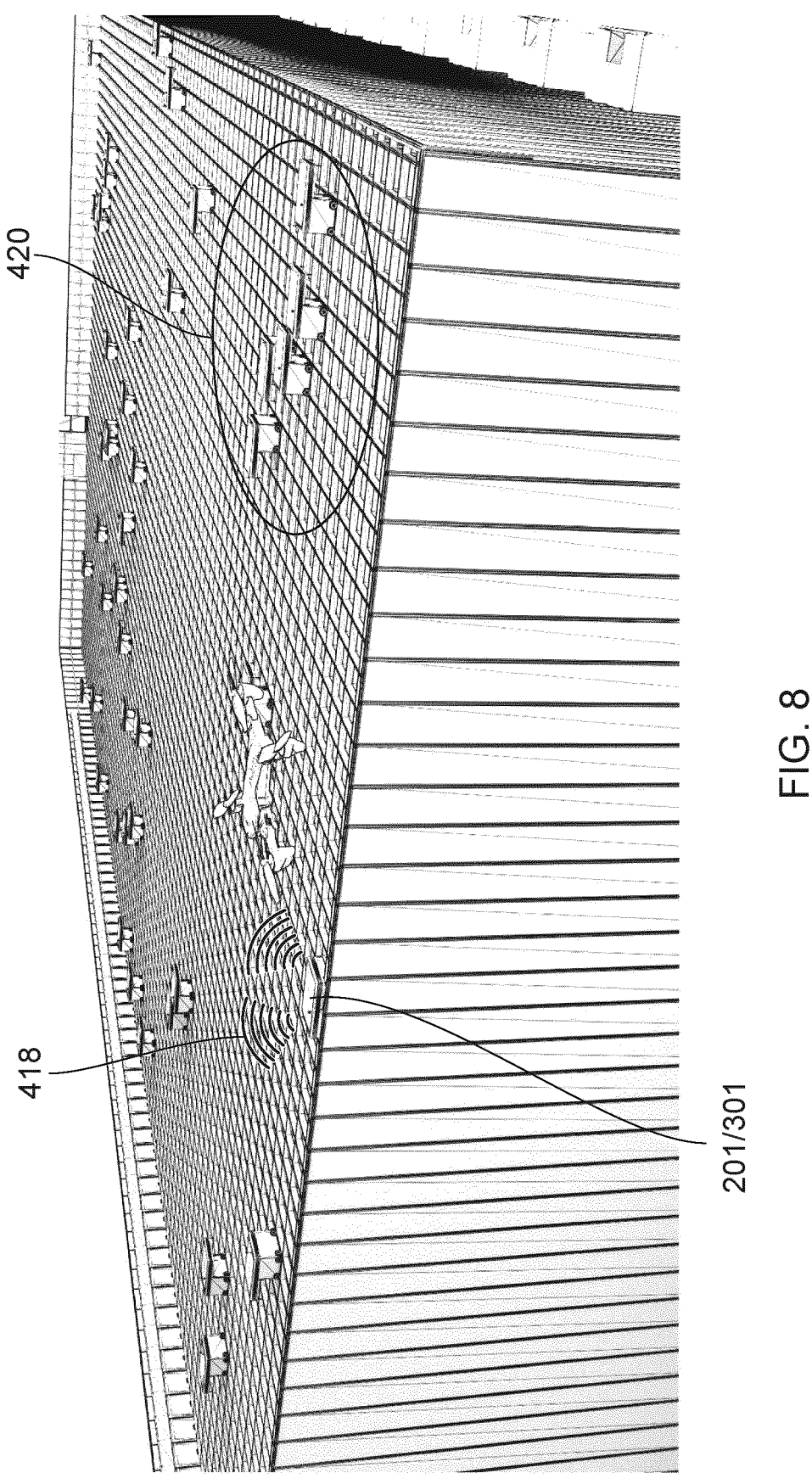
FIG. 8 is a perspective view of a framework structure, showing a plurality of container handling vehicles arranged in a recognizable pattern.

FIG. 8 conceptually illustrates one possible method for determining the drone's precise location at any given point during the flight mission, comprising communication with the control system 500 or exception handler module 500, which knows the precise location of operational vehicles 201/301. Operational vehicles may emit a location signal 418 detectable by drone 400. Alternatively, drone 400 may be equipped with a camera arranged to detect a plurality of vehicle arranged in a specific pattern 420 in a known location recognizable by exception handler module 501.

Figure 9:
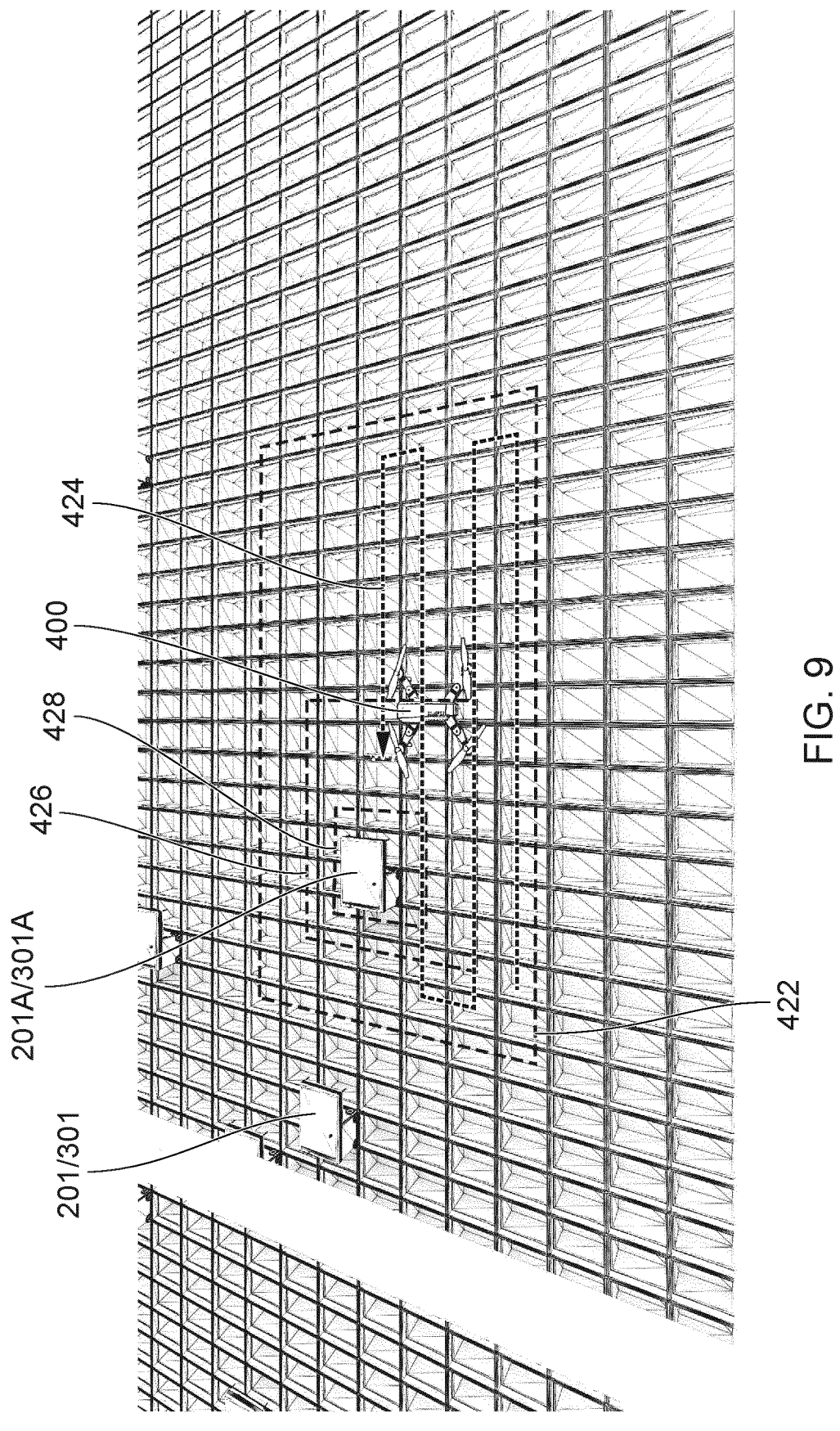
FIG. 9 is a top view illustrating a drone executing a search pattern, as well as sections of the grid blocked by the exception handling module.

Alternatively, drone 400 may be commanded to fly above the surface of the framework structure, counting cells in the grid structure in the X and Y directions until the drone reaches the coordinates of a first, large blocked zone 422 shown in FIG. 9 defined by exception handler module 500 and based upon an estimated location of disabled vehicle 201A/301A.

Figure 10:
FIG. 10 is a top view illustrating a drone locating a container handling vehicle by detection of a short range distress signal.

As illustrated in FIG. 9, upon reaching first blocked zone 422, the drone 400 may be commanded to execute a pre-programmed search pattern 424. As the drone executes the search pattern, the exception handler module may periodically redefine a second, smaller blocked zone 426. The drone continues along its search pattern until eventually visually locating disabled vehicle 201A/301A, whereupon the exception handler module defines a third, most limited blocked zone 428. As illustrated in FIG. 10, drone 400 may alternatively detect a distress signal 429 emitted by the disabled vehicle.

Upon reaching its intended location, the drone may perform a visual inspection, for example by recording still images or video with its cameras. Alternatively, human pilot 402 may perform the visual inspection.

Upon completion of the mission, drone 400 returns to its launch pad 406, either by a preprogrammed return command, by again counting grid cell, or with assistance from the human pilot.

In the preceding description, various aspects of an inspection method employing a flying drone have been described. However, this description is not intended to be construed in a limiting sense. Various modifications and variations of the illustrative embodiment, as well as other embodiments of the system, which are apparent to persons skilled in the art to which the disclosed subject matter pertains, are deemed to lie within the scope of the present invention.

LIST OF REFERENCE NUMBERS

Prior Art (FIGS. 1-4):
1 Prior art automated storage and retrieval system
100 Framework structure
102 Upright members of framework structure
103 Horizontal members of framework structure
104 Storage grid
105 Storage column
106 Storage container
106' Particular position of storage container
107 Stack
108 Rail system
110 Parallel rails in first direction (X)
110*a* First rail in first direction (X)
110*b* Second rail in first direction (X)
111 Parallel rail in second direction (Y)
111*a* First rail of second direction (Y)
111*b* Second rail of second direction (Y)
112 Access openings/Grid cells
119 First port column
120 Second port column
201 Prior art storage container vehicle
201*a* Vehicle body of the storage container vehicle 201
201*b* Drive means/wheel arrangement, first direction (X)
201*c* Drive means/wheel arrangement, second direction (Y)
301 Prior art cantilever storage container vehicle
301*a* Vehicle body of the storage container vehicle 301
301*b* Drive means in first direction (X)
301*c* Drive means in second direction (Y)
304 Gripping device

500 Control system
501 Exception handler module
X First direction
Y Second direction
Z Third direction
201A/301A Disabled vehicle
400 Flying drone
402 Pilot
404 Flight control station
406 Launch pad
408 Airspace
410 Upper surface of framework
412 Ceiling
414 Girders
415 Camera
416 Sensors
418 Location signal
420 Known Pattern of vehicles
422 Large blocked zone
424 Search pattern
426 Smaller blocked zone
428 Final blocked zone
430 Distress signal

The invention claimed is:

1. A method for monitoring an automated storage and retrieval system, the system comprising:
   a storage grid provided by a framework structure arranged in a building under a ceiling, the framework structure comprising a rail system;
   a plurality of container handling vehicles that operate on the rail system for collecting and returning storage containers to and from storage columns, and
   a control system for monitoring and controlling the automated grid storage and retrieval system, wherein the control system comprises:
      an exception handler module responsible for identifying and attempting to correct anomalies in the operation of the storage system, and
      a flight control module responsible for controlling the flight of a flying drone in response to instructions received from the exception handler module;
   wherein the method comprises:
      launching the flying drone equipped with a camera to an altitude in an airspace located between an upper surface of framework structure and the ceiling or a roof obstacle beneath the ceiling,
      navigating the drone to a suspected location of an anomaly in the system, the anomaly being a malfunctioning container handling vehicle, a specific cell of the grid at which the malfunctioning vehicle is located being unknown to the exception handler module,
      using the drone to locate the anomaly, and
      performing a visual inspection of the anomaly using the camera of the flying drone, wherein the exception handler module defines a first, larger blocked zone of the grid surrounding the suspected location of the anomaly, inside which no container handling vehicles are permitted to operate, and wherein the exception handler module defines a second, smaller blocked zone based upon input received from the drone.

2. The method according to claim 1, wherein the flight control module comprises instructions to limit the altitude of the drone during horizontal flight to an airspace between an upper surface of the framework structure and a ceiling.

3. The method according to claim 1, wherein the drone is guided to the suspected location of the anomaly by recognizing a known pattern in positioning of container handling vehicles.

4. The method according to claim 1, wherein the drone is guided to the suspected location of the anomaly by counting grid cells in first and second directions to arrive at grid coordinates specified by the exception handler module.

5. The method according to claim 1, wherein the flight control module instructs the drone to execute a preprogrammed search pattern to locate the anomaly.

6. The method according to claim 1, wherein a human pilot assumes flight control of the drone and performs a visual inspection of the anomaly.

7. The method of claim 1, wherein the framework structure comprises a rail system arranged at an upper level of the framework structure, the rail system comprising a first set of parallel rails arranged in a horizontal plane and extending in a first direction, and a second set of parallel rails arranged in the horizontal plane and extending in a second direction which is orthogonal to the first direction, which first and second sets of rails form a grid pattern in the horizontal plane comprising a plurality of adjacent access openings/grid cells, and the storage grid defining a plurality of storage columns, each storage column being arranged to store a respective stack of storage containers, wherein the storage columns are located beneath the rail system and wherein each storage column is located vertically below a respective access opening/grid cell, wherein the exception handler module defines a first, larger blocked zone of the grid surrounding the suspected location of the anomaly, inside which no container handling vehicles are permitted to operate, and wherein the exception handler module defines a second, smaller blocked zone based upon input received from the drone.

8. The method according to claim 7, wherein the flight control module comprises instructions to limit the altitude of the drone during horizontal flight to an airspace between an upper surface of the framework structure and a ceiling.

9. The method according to claim 7, wherein the drone is guided to the suspected location of the anomaly by recognizing a known pattern in positioning of container handling vehicles.

10. The method according to claim 7, wherein the drone is guided to the suspected location of the anomaly by counting grid cells in the first and second directions to arrive at grid coordinates specified by the exception handler module.

11. The method according to claim 7, wherein the flight control module instructs the drone to execute a preprogrammed search pattern to locate the anomaly.

12. The method according to claim 7, wherein a human pilot assumes flight control of the drone and performs a visual inspection of the anomaly.

* * * * *